(12) United States Patent
Cinotti et al.

(10) Patent No.: US 6,851,919 B2
(45) Date of Patent: Feb. 8, 2005

(54) EQUIPMENT FOR SUPERIMPOSING TWO LAYERS OF PRODUCTS TO BE PACKAGED

(75) Inventors: Andrea Cinotti, Bologna (IT); Mirko Cassoli, Bologna (IT)

(73) Assignee: Casmatic SpA, Bologna (IT)

( * ) Notice: Subject to any disclaimer, the term of this patent is extended or adjusted under 35 U.S.C. 154(b) by 59 days.

(21) Appl. No.: 10/172,987

(22) Filed: Jun. 18, 2002

(65) Prior Publication Data

US 2002/0189921 A1 Dec. 19, 2002

(30) Foreign Application Priority Data

Jun. 19, 2001 (IT) ..................... TO2001A0592

(51) Int. Cl.⁷ .............................. B65G 57/112
(52) U.S. Cl. ................. 414/794.5; 198/369.2
(58) Field of Search .................. 414/794.4, 794.5, 414/794.6, 794.7; 198/418.4, 435, 364.2

(56) References Cited

U.S. PATENT DOCUMENTS 4,284,187 A * 8/1981 Kramer ................ 198/435
5,810,149 A * 9/1998 Sandberg .............. 198/435 X
6,227,377 B1 * 5/2001 Bonnet .................. 198/435 X

* cited by examiner

Primary Examiner—Donald W. Underwood
(74) Attorney, Agent, or Firm—Sughrue Mion, PLLC

(57) ABSTRACT

Equipment for superimposing layers of products to be packaged (P), comprising: a feed surface (12) associated to a first product-feed device (18); and a pair of preparation surfaces (24, 26) set on top of one another and designed to receive each a respective layer of products to be packaged (P), the preparation surfaces (24, 26) being associated each to a respective feed device (36, 38), the said feed devices (36, 38) being designed to cause synchronized advance of corresponding layers of products (P) along the preparation surfaces (24, 26). Both of the preparation surfaces (24, 26) are mobile so as to bring alternately the respective product-intake end (28, 30) into a position corresponding to the product-output end (16) of the feed surface (12).

1 Claim, 2 Drawing Sheets

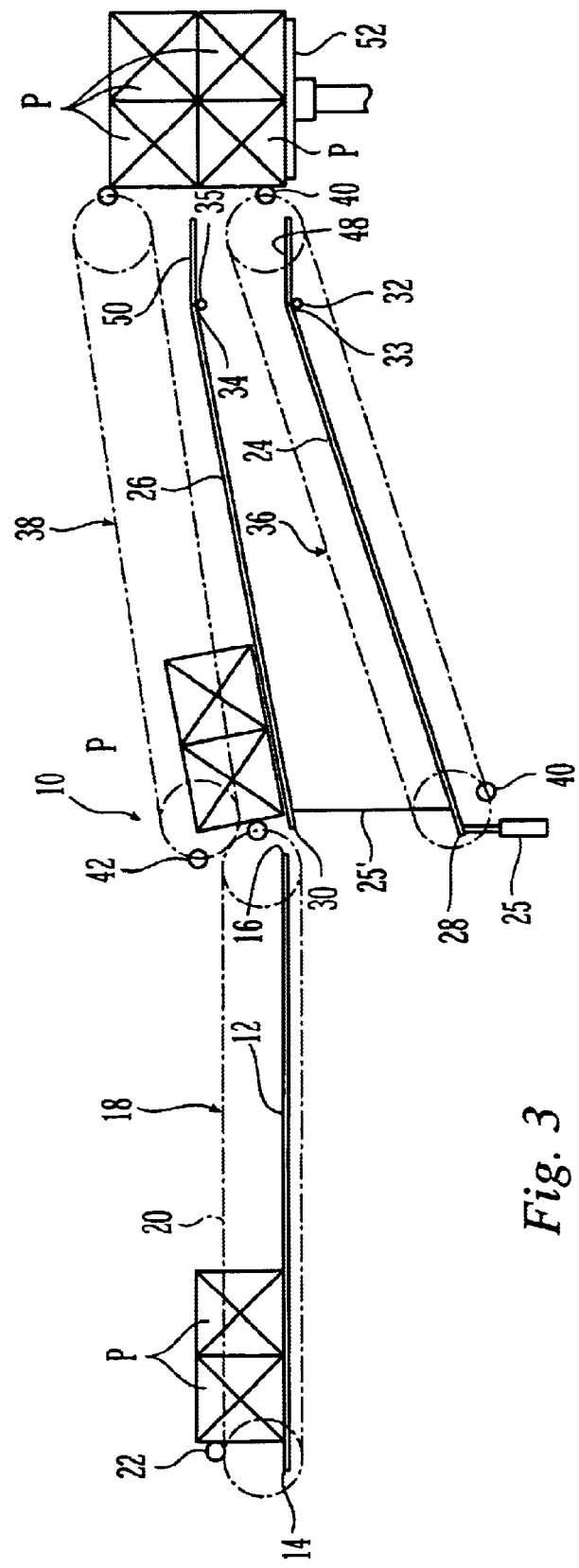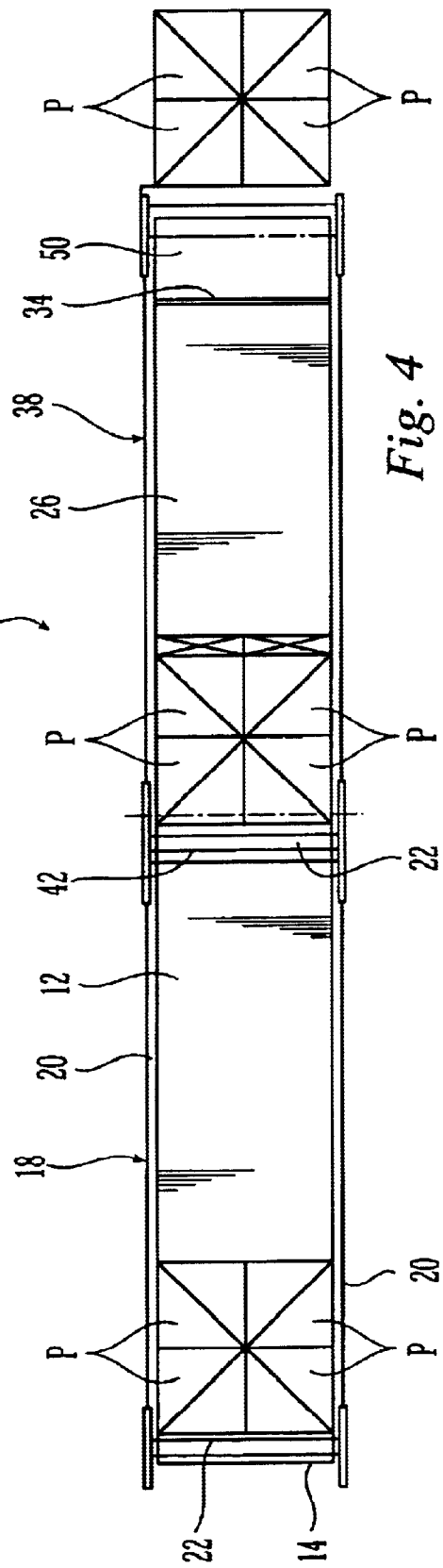
Fig. 3
Fig. 4

EQUIPMENT FOR SUPERIMPOSING TWO LAYERS OF PRODUCTS TO BE PACKAGED

BACKGROUND OF THE INVENTION

The present invention relates to a piece of equipment for superimposing two layers of products to be packaged. The invention has been developed in particular with a view to its application to automatic machines for packaging rolls of paper, such as rolls of toilet paper or rolls of kitchen wipes, which are arranged for the formation of packs consisting of two layers of products. The Italian patent No. 1 225 033 describes a piece of equipment designed to form two layers set on top of one another of cylindrical products, such as rolls of paper. The known equipment described in the aforesaid Italian patent application comprises a stationary feed surface for feeding the products, which is associated to a first device for advance of the products. Set downstream of the product-feed surface is an oscillating surface articulated about an axis transverse to the direction of advance of the products. The intake end of the oscillating surface receives the products from the output end of the stationary feed surface, whilst the output end of the oscillating surface moves cyclically between two operating positions. Provided downstream of the oscillating surface are two preparation surfaces set one on top of the other, which receive each a respective layer of products coming from the oscillating surface. The preparation surfaces are associated each to a respective product-feed device, the said devices being synchronized with one another and being set in such a way that the layers of products that advance on the preparation surfaces are perfectly set on top of one another at the output ends of the preparation surfaces.

Starting from the above example of prior art, the present invention has the purpose of providing a piece of equipment for superimposing two layers of products to be packaged that is simpler, more economical and is made up of a smaller number of components than the equipment according to the prior art described previously.

SUMMARY OF THE INVENTION

According to the present invention, the above purpose is achieved by a piece of equipment having the characteristics that form the subject of the main claims.

BRIEF DESCRIPTION OF THE DRAWINGS

The characteristics and advantages of the present invention will emerge clearly from the ensuing description, provided purely by way of non-limiting example, with reference to the attached drawings, in which:

FIGS. 2 and 3 are schematic side views illustrating different operating positions of the equipment of FIG. 1; and FIG. 4 is a schematic plan view of the equipment of FIG. 1.

DETAILED DESCRIPTION OF THE INVENTION

Figure 1:
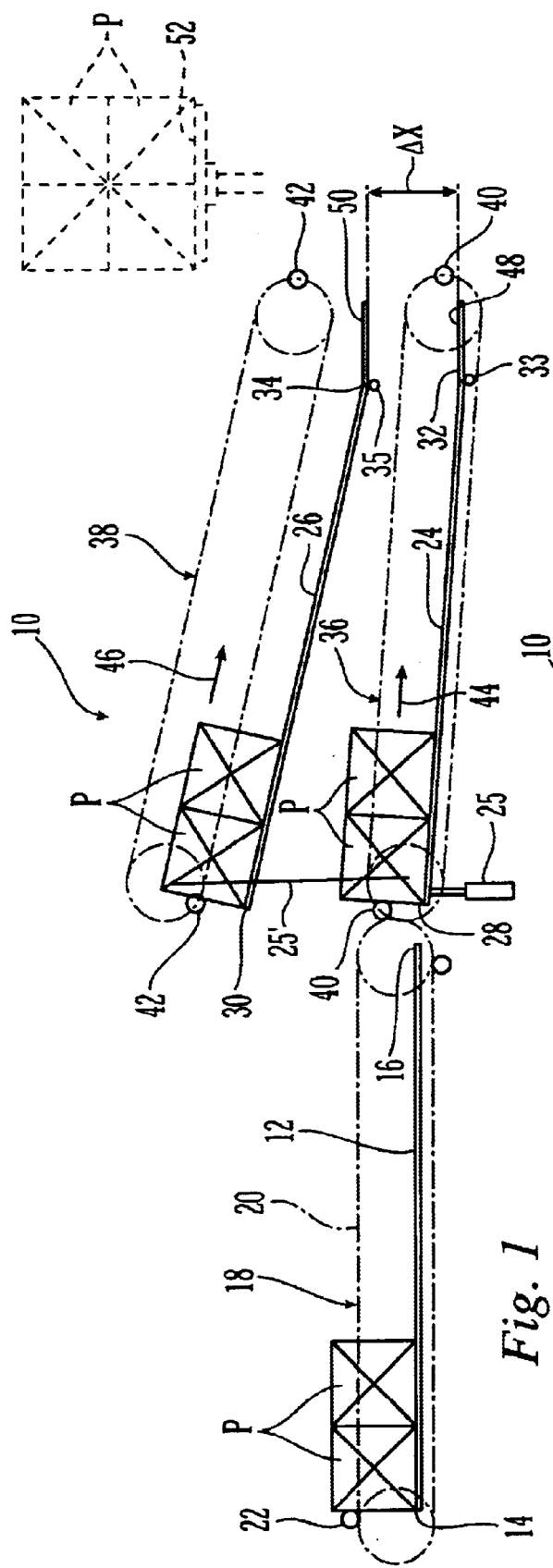
FIG. 1 is a schematic side elevation of a piece of equipment according to the present invention.

With reference to the drawings, number 10 designates a piece of equipment for superimposing layers of products P, consisting, for example, of rolls of paper, which advance in a direction parallel to their own longitudinal axis. The equipment 10 comprises a stationary feed surface 12 having an intake end 14 and an output end 16. The feed surface 12 is associated to a feed device 18, which may be of any type and is designed to cause advance of the products P from the intake end 14 towards the output end 16. Preferably, the product-feed device 18 comprises a pair of motor-driven chains 20 (FIG. 4) which are set laterally with respect to the feed surface 12 and carry a plurality of transverse rods 22 that push the products P along the feed surface 12.

The equipment 10 comprises two preparation surfaces 24, 26 set on top of one another and each having a respective intake end 28, 30 and a respective output end 32, 34. The preparation surfaces 24, 26 are associated each to a respective product-feed device 36, 38. The product-feed devices 36, 38 may be built in a way similar to that of the feed device 18 associated to the feed surface 12. The reference numbers 40, 42 designate drawing rods which can move in the direction indicated by the arrows 44, 46 to cause the products to advance from the intake ends to the output ends of the preparation surfaces 24, 26. The preparation surfaces 24, 26 are mobile so as to bring alternately their respective intake ends 28, 30 up to the output end 16 of the feed surface 12. The device 25, 25' controls movement of the preparation surfaces 24, 26. In the embodiment illustrated in the figures, the preparation surfaces 24, 26 can oscillate about respective axes 33, 35 set at the output ends 32, 34 of the preparation surfaces 24, 26. In an alternative embodiment, which is not illustrated in the drawings, the preparation surfaces 24, 26, instead of being hinged about an axis, could be translated in a direction orthogonal to the direction of movement of the products.

In the embodiment illustrated by way of example in the figures, two short stationary surfaces 48, 50 are set in the proximity of the output ends 32, 34 of the preparation surfaces 24, 26. Set immediately downstream of the stationary surfaces 48, 50 is a lifting plate 52 which can move vertically and is designed to receive two layers of products set on top of one another that are to be packaged in a plastic film, according to modalities in themselves known which do not fall within the scope of the present invention.

Figure 2:
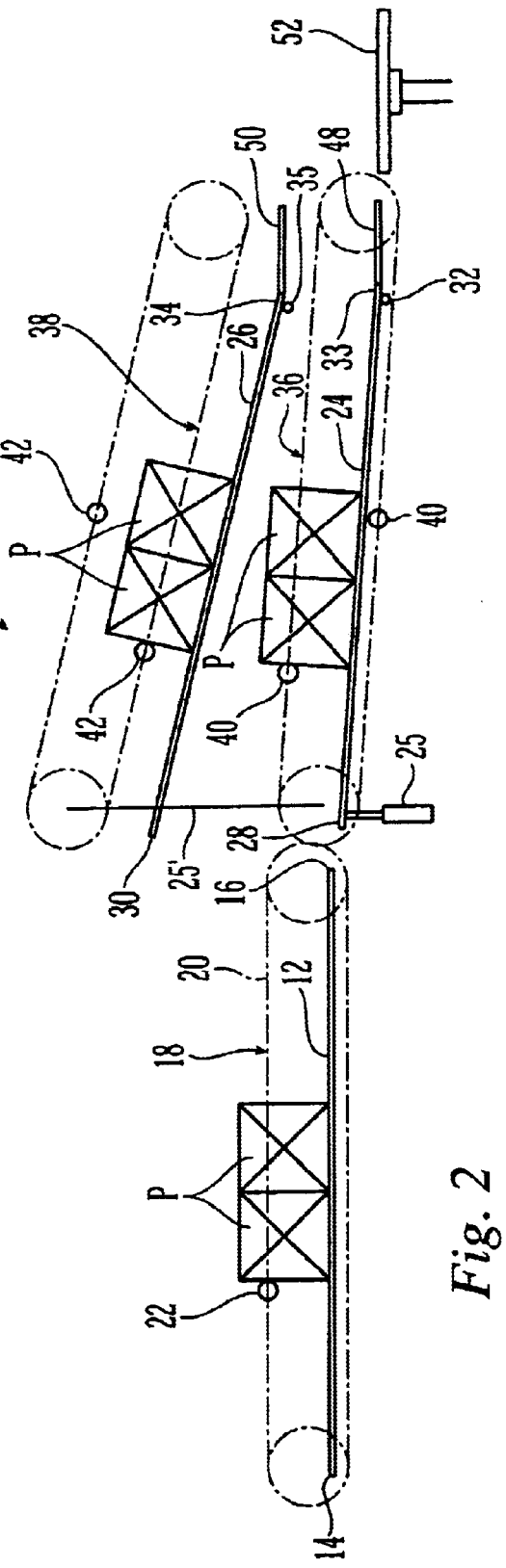

During operation, the preparation surfaces 24, 26 are cyclically displaced between the two operating positions, illustrated in FIGS. 2 and 3, in a way synchronized with the movement of the feed devices 18, 36 and 38.

The products P coming from the feed surface 12 are alternately loaded onto the bottom preparation surface 24 and onto the top preparation surface 26. The two layers of products then advance synchronously along the two surfaces 24, 26 and are laid on top of one another on the lifting plate 52, as illustrated in FIG. 3.

As compared to the machine according to the prior art described in the Italian patent No. 1 225 033, the solution according to the present invention makes it possible to reduce the length of the equipment for forming the layers. In fact, all other conditions being equal, the overall length of the machine may be reduced by an amount corresponding to the length of the oscillating surface that is present in the solution according to the prior art.

Preferably, the distance $\Delta x$ between the output ends of the preparation surfaces 24, 26 may be adjusted according to the diameters of the rolls to be packaged.

What is claimed is:

1. Equipment for superimposing layers of products to be packaged comprising a first elongated feed surface for receiving products to be packaged, a first product feed device for moving said products along said first feed surface, first and second preparation surfaces disposed downstream from said first feed surface in vertically spaced apart relation for receiving said products from said first feed surface, second and third feeding means for moving said products along said first and second preparation surfaces, said preparation surfaces each being pivoted about axes at a downstream end of each preparation surface, a device for simultaneously controlling pivotal movement of said preparation surfaces about said axes to alternately bring a leading edge of each preparation surface into alignment with a downstream end of said first feed surface to enable movement of said packages from said first feed surface to said first and second preparation surfaces, and a movable lifting plate mounted for vertical movement downstream of said first and second preparation surfaces for receiving said products from said preparation surfaces simultaneously in stacked relation on said movable plate.

* * * * *